Figure 1:
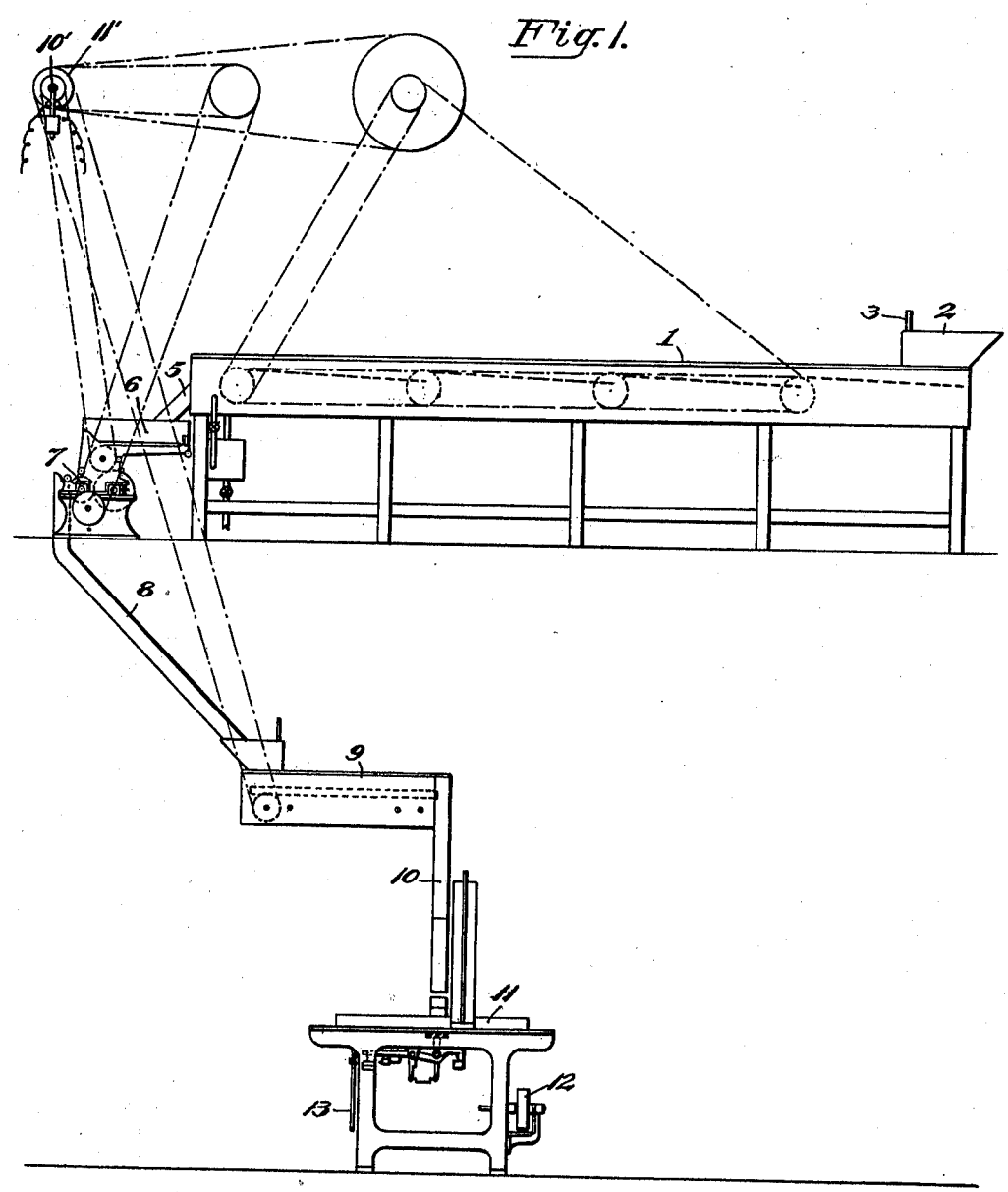

N. B. CONVERSE.
METHOD OF TREATING RAISINS IN THE PROCESS OF SEEDING AND APPARATUS THEREFOR.
APPLICATION FILED AUG. 15, 1905.

992,856.

Patented May 23, 1911.

3 SHEETS—SHEET 1.

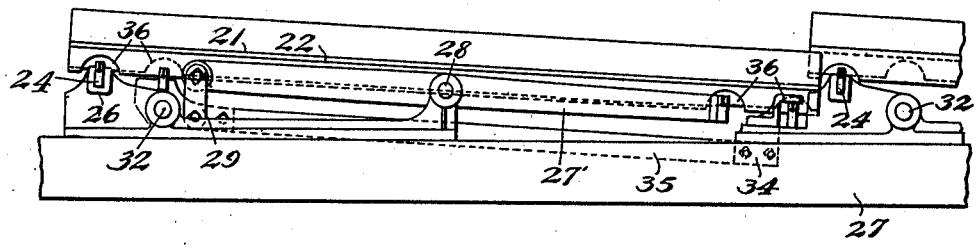
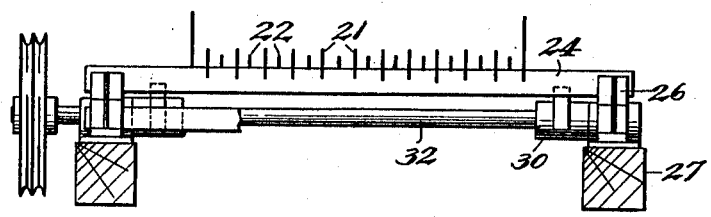
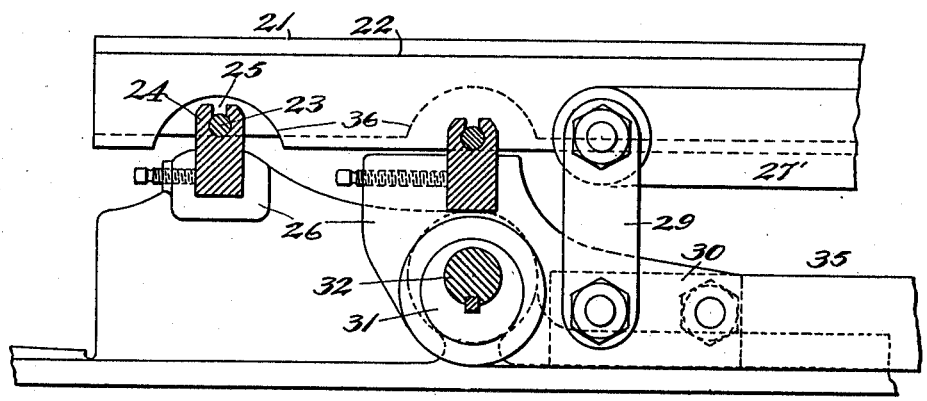
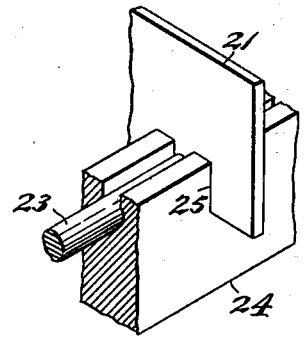

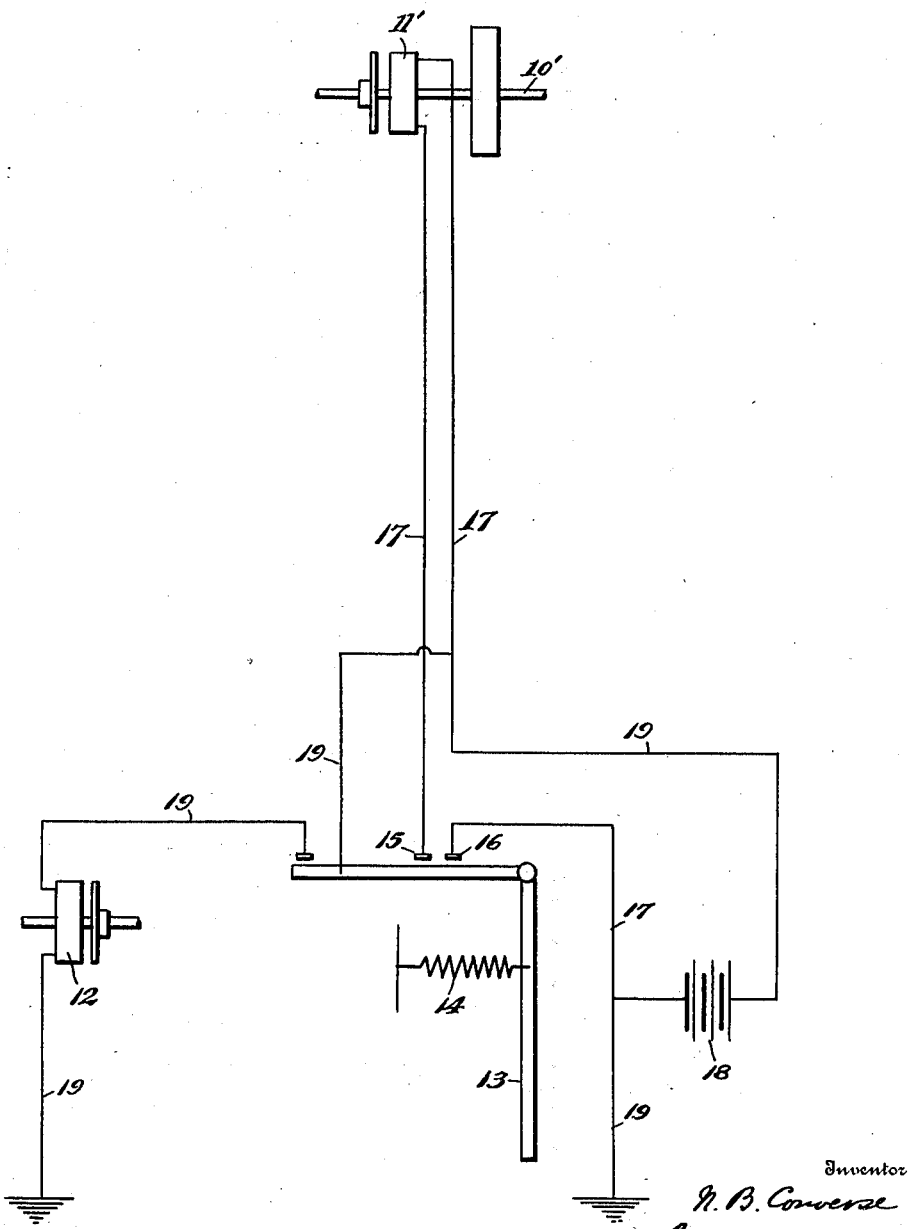

UNITED STATES PATENT OFFICE.

NEWTON B. CONVERSE, OF FRESNO, CALIFORNIA, ASSIGNOR, BY DIRECT AND MESNE ASSIGNMENTS, TO HIMSELF, J. E. DICKINSON, FRANCIS M. WRIGHT, B. W. NORTON, L. Z. ICKES, AND K. ARAKELIAN, TRUSTEES.

METHOD OF TREATING RAISINS IN THE PROCESS OF SEEDING AND APPARATUS THEREFOR.

992,856.   Specification of Letters Patent.   Patented May 23, 1911.

Application filed August 15, 1905. Serial No. 274,275.

*To all whom it may concern:*

Be it known that I, NEWTON B. CONVERSE, a citizen of the United States, residing at Fresno, in the county of Fresno and State of California, have invented certain new and useful Improvements in Methods of Treating Raisins in the Process of Seeding and Apparatus Therefor, of which the following is a specification.

This invention relates to an improved method of treating raisins when seeding them in cartons of uniform weight or size, and the object of the invention is to devise a method by which this uniformity can be accomplished with certainty and accuracy.

The invention also relates to apparatus for carrying out this method.

Various attempts have heretofore been made to provide machinery to pack seeded raisins but without success so far as my knowledge extends. The reason for these failures has generally been that the raisins were not supplied to the packing machine in uniform quantities, and could not be so supplied. For in the first place the raisins were not fed from the sweater to the seeding machine in uniform quantities, and, again, coming out of the seeding machine irregularly, there was no opportunity to distribute them evenly before feeding them to the packing machine, on account of their sticky character after leaving the seeding machine, which prevents their being distributed evenly. And, on account of the sticky character of the seeded raisins, it was difficult to feed them on to a weighing scale to secure anything like uniform weight, because of large bunches of them sticking together, thus causing great variations in the weight of the packages. Also it is not practicable to measure them out by their volume, on account of the great variation in specific gravity of raisins.

The object of my invention is to provide means whereby these difficulties may be overcome.

In the accompanying drawing, Figure 1 is a view of the whole apparatus certain parts being shown diagrammatically; Fig. 2 is a side elevation of part of a series of conveyers; Fig. 3 is an end view of the same; Fig. 4 is an enlarged side view of the ends of the conveyer blades; Fig. 5 is a broken perspective view of a blade and its support; Fig. 6 is a diagrammatic view of the electrical connections.

Referring to the drawing, 1 represents the casing of a sweating machine. This sweater should be of a character tending to distribute the raisins, and produce uniform flow thereof, and for this purpose I prefer the construction disclosed in my application for patent on apparatus for sweating raisins filed of even date herewith, Serial No. 274,272. Such a machine comprises a hopper 2, into which the raisins or other fruit are fed from a suitable distributer and from which the discharge is controlled by an adjustable gate 3. Below said gate the raisins are discharged on to the first of a series of conveyers, these conveyers being in a substantial horizontal series extending the length of the chamber of the sweater. Each set of conveyers slopes slightly upward and discharges at its forward end on to the rear end of the next set. The conveyer comprises two sets of conveyers blades 21, 22, alternating with each other. The blades 21 of one set are pivoted at their forward ends upon a rod 23 secured in a support 24 which is grooved, as shown at 25, to receive said blades, the support being secured in stationary blocks 26 supported upon side beams 27. The rear ends of the blades are similarly supported by blocks secured to the rear ends of levers 27' fulcrumed at 28, the front ends of said levers being attached by links 29 to saddles 30 carried on the rings of eccentrics 31 mounted upon a transverse shaft 32 driven from any suitable source of power. By this means a vertically oscillating motion is imparted to the blades 21. The other set of blades 22 are given a double movement, their forward ends having a movement of longitudinal reciprocation. The revolution of the forward ends is caused by their supporting blocks 26 being secured to the saddles 30, while the rear ends receive their longitudinal reciprocation by their blocks being attached to castings 34, connected by links 35 with the saddles 30. The blades of each set are recessed on their under side, as shown at 36, to allow freedom of movement, where they pass over the supports for the other set. By means of the movements of these two sets of blades, alternating with each other, the raisins are caused to advance. At both ends the second set of blades advance when above the first set and move backward when below them, said first set having no longitudinal movement. When the blades of the second set advance, they carry the raisins forward, but when they move back, they leave the raisins resting on the blades of the first set. From the sweating machine the raisins are discharged by the last conveyer therein into a chute 5 which leads to a conveyer 6 discharging directly into a seeding machine 7 of any usual construction, which in turn leads by a chute 8 to a conveyer 9 discharging into a spout 10 of a packing machine 11 also of any usual construction, in which they are discharged into the carton on the weighing scales and packed.

It is important for the successful operation of the machine that all the several devices disclosed herein should be operated in unison. For this purpose the main shaft 10′ which actuates the sweater and seeder, is controlled by an electromagnetic clutch 11′, and the packing machine is also controlled by an electromagnetic clutch 12. These clutches are energized when the machine is in operation, and to stop the machinery the circuits through the clutches are broken by means of a lever 13, the movement of which against the spring 14 breaks contact between two contact points 15, 16, in a circuit 17 through the generator 18, and through the electromagnetic clutch 11. It also breaks a circuit 19 through the electromagnetic clutch 12 and the ground and operates said clutch to stop the packing machine.

It is understood that the invention is not limited to any particular form of packing machine. The novel idea embodied in this invention is to take advantage of the fact that said raisins may be readily distributed in a uniform layer when they are dry and hard whereas it is difficult to so distribute them when they are softened by the sweating process and particularly when they have passed through the seeding machine. But by so distributing them when they are dry and hard before passing through the sweater and providing apparatus which will maintain them uniformly distributed during their whole course to the packing machine, they are fed to said packing machine uniformly, thereby rendering it possible to pack them in uniform quantities without variation of weight.

I claim:—

1. The method of treating raisins to feed them, freed from their seeds, to an apparatus for separating them into aggregations of uniform magnitude, which consists in starting the raisins when in a hard, dry, and non-adhesive condition in a uniformly moving stream, maintaining them in such motion while sweating or softening them, transferring them in a uniformly moving stream to a seeding machine, seeding them, and transferring them in a uniformly moving stream from the seeding machine to said apparatus, substantially as described.

2. A method of treating raisins, or other fruit, for seeding them which consists in starting the raisins when in a hard, dry condition, in a uniformly moving stream to a sweating chamber, maintaining them in said chamber in a uniformly moving stream, transferring them in a uniformly moving stream from said sweating chamber to the seeding machine, and passing them in such stream into said seeding machine, substantially as described.

3. An apparatus of the character described comprising a sweating chamber, means for starting the raisins at their entrance into said chamber in a uniformly moving stream, means for maintaining them in such motion while in said chamber, a seeding machine, means for transferring them in a uniformly moving stream from the sweating chamber to the seeding machine, an apparatus for separating the stream of raisins into aggregations of uniform magnitude, and means for transferring the raisins in a uniformly moving stream from the seeding machine to said apparatus, substantially as described.

4. An apparatus of the character described, comprising a sweating chamber, means for starting raisins at their entrance into said chamber in a uniformly moving stream, means for maintaining them in a uniformly moving stream, means for maintaining them in such a motion in said chamber, a seeding machine, and means for transferring them in a uniformly moving stream from sweating chamber to said machine, substantially as described.

In witness whereof I have hereunto set my hand in the presence of two subscribing witnesses.

NEWTON B. CONVERSE.

Witnesses:
D. A. CASLIM,
L. B. HAYHURST.